(12) United States Patent
Li

(10) Patent No.: US 12,407,114 B1
(45) Date of Patent: Sep. 2, 2025

(54) STRING LIGHT THREE-WAY LINE STRUCTURE USING RIVETING PROCESS, AND STRING LIGHT

(71) Applicant: Shenzhen iLamp Technology Co., LTD, Shenzhen (CN)

(72) Inventor: Yuanlong Li, Hengnan County (CN)

(73) Assignee: Shenzhen ilamp Technology Co., LTD., Baoan Dist. (CN)

( * ) Notice: Subject to any disclaimer, the term of this patent is extended or adjusted under 35 U.S.C. 154(b) by 0 days.

(21) Appl. No.: 18/976,190

(22) Filed: Dec. 10, 2024

(30) Foreign Application Priority Data

Oct. 24, 2024 (CN) .......................... 202422589033.6

(51) Int. Cl.
*H02G 3/18* (2006.01)
*F21S 4/10* (2016.01)
*F21V 23/00* (2015.01)
*H01R 4/06* (2006.01)
*H02G 3/08* (2006.01)

(52) U.S. Cl.
CPC .................. *H01R 4/06* (2013.01); *F21S 4/10* (2016.01); *F21V 23/001* (2013.01); *H02G 3/083* (2013.01); *H02G 3/18* (2013.01)

(58) Field of Classification Search
CPC ........... H02G 3/18; H02G 3/08; H02G 3/081; H02G 3/22; H02G 3/28; H01R 4/06; H01R 3/00; F21S 4/10; F21S 4/00; F21V 23/001; F21V 23/00

USPC ....... 174/68.1, 68.3, 72 A, 71 R, 72 R, 88 R, 174/70 C, 50; 220/3.2, 3.3, 3.8; 248/49, 248/68.1; 439/387, 411, 412, 413
See application file for complete search history.

(56) References Cited

U.S. PATENT DOCUMENTS

| | | | | |
|---|---|---|---|---|
| 3,033,913 A | * | 5/1962 | Dietze ...................... | H02G 3/16 174/59 |
| 3,715,459 A | * | 2/1973 | Hoffman .............. | H02G 15/113 174/76 |
| 3,848,224 A | * | 11/1974 | Olivero .................... | H02G 3/16 174/59 |
| 5,594,210 A | * | 1/1997 | Yabe ........................ | H01R 4/70 174/76 |
| 6,333,464 B1 | * | 12/2001 | Ellison ..................... | H01R 4/30 174/92 |
| 7,950,956 B2 | * | 5/2011 | Hiner ....................... | H01R 4/70 174/92 |
| 8,960,973 B1 | * | 2/2015 | Kathawate ............... | H01R 4/70 174/92 |

(Continued)

*Primary Examiner* — Angel R Estrada
(74) *Attorney, Agent, or Firm* — Jose Cherson Weissbrot

(57) ABSTRACT

The present disclosure relates to a three-way line structure for a string light using a riveting process, and a string light. The three-way line structure for a string light using a riveting process includes: a first power wire for connection to a positive electrode of a power source; a second power wire for connection to a negative electrode of the power source; a first conductor wire electrically connected to the first power wire, an electrical connection between the first conductor wire and the first power wire being riveted with a first copper strip; and a second conductor wire electrically connected to the second power wire, an electrical connection between the second conductor wire and the second power wire being riveted with a second copper strip.

9 Claims, 3 Drawing Sheets

(56) References Cited

U.S. PATENT DOCUMENTS 11,600,982 B1 * 3/2023 Wroblewski ............ H02G 15/16
11,705,710 B2 * 7/2023 Iyer .......................... H05B 3/08
                                                    174/84 R

* cited by examiner

STRING LIGHT THREE-WAY LINE STRUCTURE USING RIVETING PROCESS, AND STRING LIGHT

TECHNICAL FIELD

The present disclosure relates to the field of lights, and in particular to a three-way line structure for a string light using a riveting process, and a string light.

BACKGROUND ART

Manual soldering is used in an existing three-way line structure for a string light to connect conducting wire contacts between conductors. Such a three-way line structure using a soldering process has the disadvantages that due to manual soldering, the manufacturing efficiency is low, the yield rate is not guaranteed, and personnel changes, soldering iron temperature changes and even varying percentages of rosin in solder wires will lead to poor solder contact.

SUMMARY

In order to overcome the disadvantages of the prior art, the present disclosure provides a three-way line structure for a string light using a riveting process and a string light, which has high manufacturing efficiency, high yield rate, high controllability of a manufacturing process, and can reduce manufacturing costs.

The present disclosure is implemented by using the following technical solution.

A three-way line structure for a string light using a riveting process includes: a first power wire for connection to a positive electrode of a power source; a second power wire for connection to a negative electrode of the power source; a first conductor wire electrically connected to the first power wire, an electrical connection between the first conductor wire and the first power wire being riveted with a first copper strip; and a second conductor wire electrically connected to the second power wire, an electrical connection between the second conductor wire and the second power wire being riveted with a second copper strip; wherein the first conductor wire and the second conductor wire are connected to positive and negative electrodes of a light respectively so as to be able to supply power to the light; and a wire protection box, wherein an accommodating space is provided in the wire protection box, the wire protection box is provided with a first opening, a second opening, and a third opening, the first opening, the second opening and the third opening are each connected to the accommodating space, the first power wire and the second power wire run through the first opening and the second opening, the first conductor wire and second conductor wire run through the third opening, the electrical connection, riveted with the first copper strip, between the first conductor wire and the first power wire is within the accommodating space, and the electrical connection, riveted with the second copper strip, between the second conductor wire and the second power wire is within the accommodating space.

A string light includes:
a plurality of lights;
and a three-way line structure for a string light using a riveting process as described above, which is connected to the plurality of lights.

Figure 1:
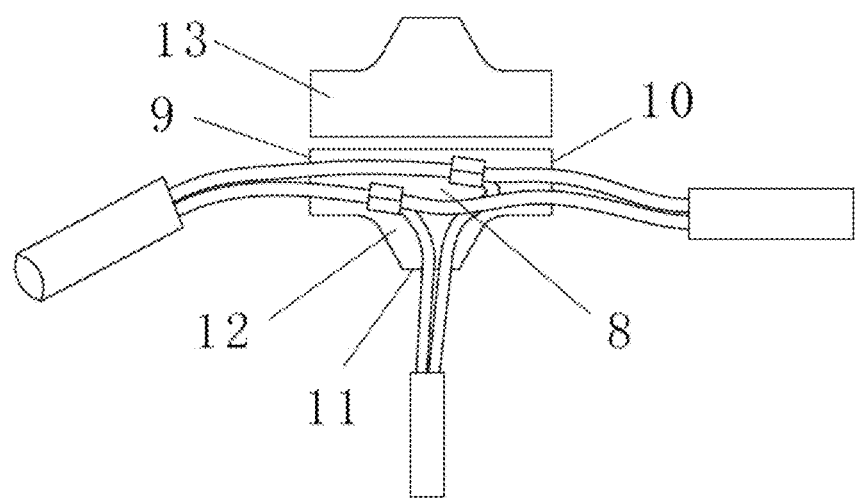
FIG. 1 is a schematic structural diagram of a three-way line structure for a string light using a riveting process according to an embodiment of the present disclosure.

List of reference signs: 1. First power wire; 2. Second power wire; 3. First conductor wire; 4. Second conductor wire; 5. First copper strip; 6. Second copper strip; 7. Wire protection box; 8. Accommodating space; 9. First opening; 10. Second opening; 11. Third opening; 12. First housing; 13. Second housing; 14. First pipe; 15. Second pipe; 16. First connection position; 17. Second connection position; 18. End portion of the first conductor wire; 19. End portion of the second conductor wire.

DETAILED DESCRIPTION OF EMBODIMENTS

Specific embodiments of the present disclosure will be described in detail in this section. Preferred embodiments of the present disclosure are illustrated in the accompanying drawings. The accompanying drawings serve to supplement the text description of the specification with figures, providing a visual understanding of each technical feature and the overall technical solution of the present disclosure, but cannot be construed as a limitation to the scope of protection of the present disclosure.

In the description of the present disclosure, it should be understood that orientation or position relationships indicated by terms "upper", "lower", "front", "rear", "left", "right", etc. are orientation or position relationships as shown in the accompanying drawings, and these terms are just used to facilitate description of the present disclosure and simplify the description, rather than indicating or implying that the mentioned device or element must have a specific orientation and must be constructed and operated in a specific orientation, and thus cannot be construed as a limitation to the present disclosure.

In the description of the present disclosure, "several" means one or more, "a plurality of" means two or more, "greater than", "less than", "over", etc. are construed as excluding the number, and "above", "below", "within", etc. are construed as including the number. The terms "first" and "second" in the description are merely intended to distinguish technical features, and cannot be construed as indicating or implying relative importance or implicitly indicating the number of the indicated technical features or implicitly indicating a sequence relationship of the indicated technical features.

In the description of the present disclosure, unless otherwise explicitly defined, the words such as "arrange", "mount" and "connect" should be understood in a broad sense, and those skilled in the art can reasonably determine the specific meanings of the above words in the present disclosure with reference to the specific contents of the technical solutions.

With reference to FIGS. 1 to 4, according to a preferred embodiment of the present disclosure, a three-way line structure for a string light using a riveting process includes: a first power wire 1 for connection to a positive electrode of a power source; a second power wire 2 for connection to a negative electrode of the power source; a first conductor wire 3 electrically connected to the first power wire 1, an electrical connection between the first conductor wire 3 and the first power wire 1 being riveted with a first copper strip 5; a second conductor wire 4 electrically connected to the second power wire 2, an electrical connection between the second conductor wire 4 and the second power wire 2 being riveted with a second copper strip 6; wherein the first conductor wire 3 and the second conductor wire 4 are connected to positive and negative electrodes of a light respectively so as to be able to supply power to the light; and a wire protection box 7, wherein an accommodating space 8 is provided in the wire protection box 7, the wire protection box 7 is provided with a first opening 9, a second opening 10, and a third opening 11, the first opening 9, the second opening 10 and the third opening 11 are connected to the accommodating space 8, the first power wire 1 and the second power wire 2 run through the first opening 9 and the second opening 10, the first conductor wire 3 and second conductor wire 4 run through the third opening 11, the electrical connection, riveted with the first copper strip 5, between the first conductor wire 3 and the first power wire 1 is within the accommodating space 8, and the electrical connection, riveted with the second copper strip 6, between the second conductor wire 4 and the second power wire 2 is within the accommodating space 8.

The three-way line structure for a string light using a riveting process of the present disclosure is provided with the first copper strip 5 and the second copper strip 6, the electrical connection between the first conductor wire 3 and the first power wire 1 is riveted with the first copper strip 5, and the electrical connection between the second conductor wire 4 and the second power wire 2 is riveted with the second copper strip 6. During the manufacturing process, the manufacturing may be carried out by an automated machine-aided auxiliary function, with high manufacturing efficiency, high yield rate, high controllability of manufacturing process, and lowered manufacturing cost.

As a preferred embodiment of the three-way line structure for a string light using a riveting process, the three-way line structure may also have the following additional technical features.

With reference to FIG. 1, in an implementation, the wire protection box 7 includes a first housing 12 and a second housing 13, and the first housing 12 is detachably connected to the second housing 13. As such, when it is necessary to check the conditions of the three-way line structure, the first housing 12 may be detached from the second housing 13, which is conducive to the inspection of the three-way line structure.

Figure 2:
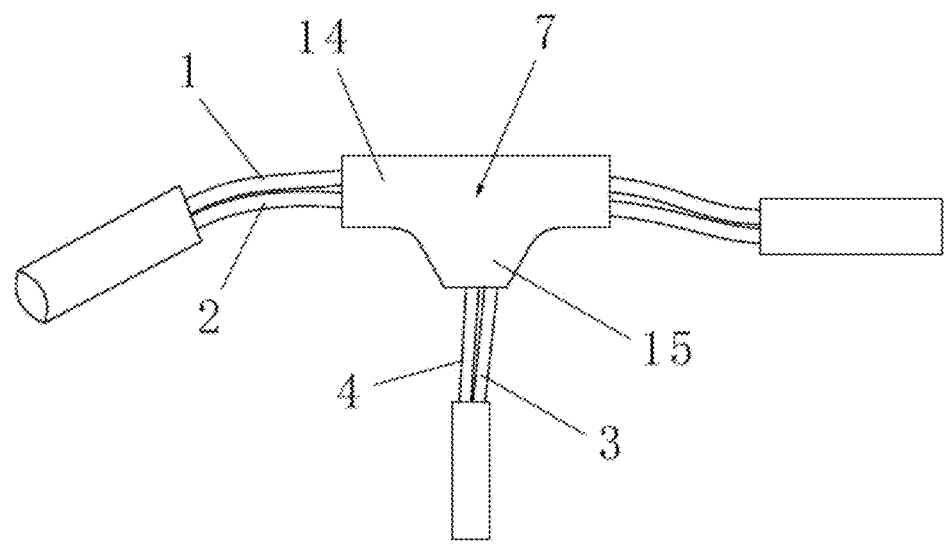
FIG. 2 is a front view of a three-way line structure for a string light using a riveting process according to an embodiment of the present disclosure.

With reference to FIG. 2, in an implementation, the wire protection box 7 includes a first pipe 14 and a second pipe 15, an end portion of the second pipe 15 is connected to the middle of the first pipe 14, the first pipe 14 is connected and perpendicular to the second pipe 15, the first opening 9 and the second opening 10 are provided at two ends of the first pipe 14 respectively, and the third opening 11 is provided at an end of the second pipe 15 away from the first pipe 14. As such, line distribution of the three-way line structure is facilitated, and the lines of the three-way line structure are well-organized. In other implementations, the wire protection box 7 may be provided in other suitable structures.

In an implementation, in the second pipe 15, a width of the second pipe 15 is gradually reduced in a direction from an end of the second pipe 15 close to the first pipe 14 to the end of the second pipe 15 away from the first pipe 14. As such, the wire protection box 7 is more suitable for the three-way line structure for a string light using a riveting process of the present disclosure. In other implementations, the second pipe 15 may have a straight form. In other implementations, other suitable structures may be used for the second pipe 15, which is not limited thereto.

In an implementation, the first copper strip 5 and the second copper strip 6 have the same shape, and the first copper strip 5 and the second copper strip 6 have the same size. As such, it is more conducive to machine-aided operations in the process of manufacturing the three-way line structure for a string light using a riveting process, thus improving the manufacturing efficiency and yield rate. In other implementations, the first copper strip 5 and the second copper strip 6 may have different shapes. In other implementations, the first copper strip 5 and the second copper strip 6 may have different sizes.

Figure 3:
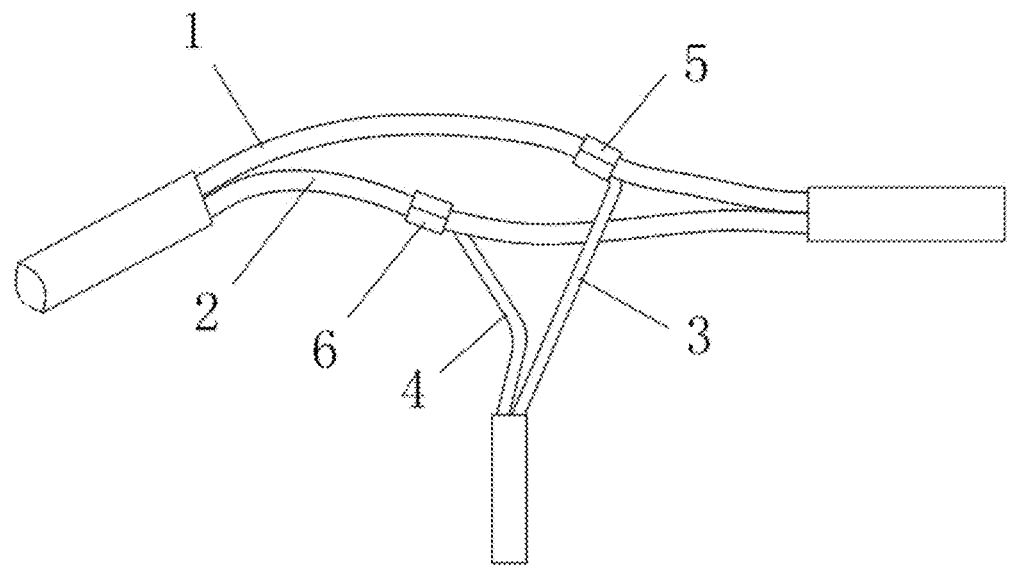
FIG. 3 is a schematic diagram of a three-way line structure for a string light using a riveting process, with a wire protection box removed, according to an embodiment of the present disclosure.
Figure 4:
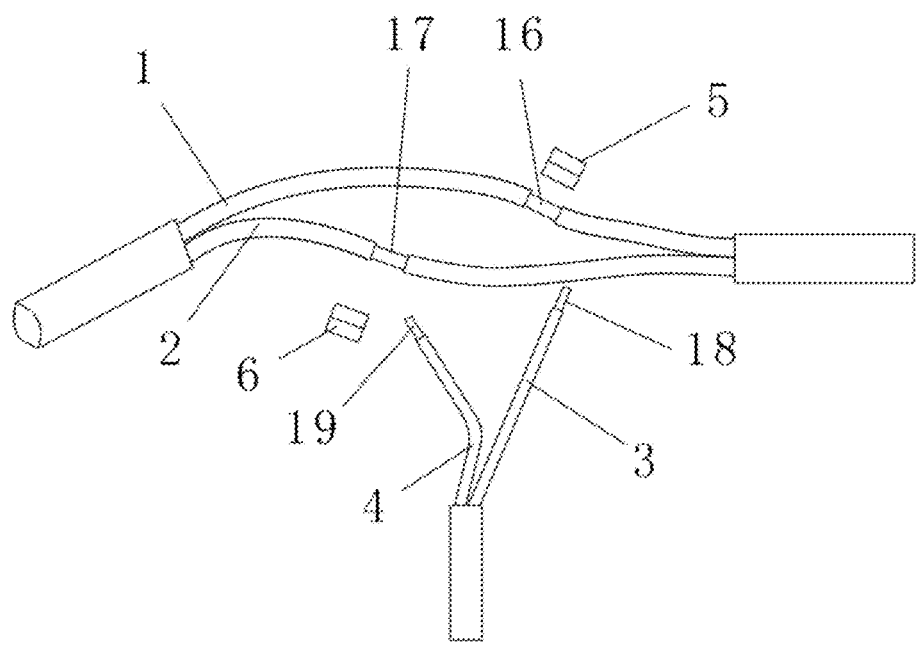
FIG. 4 is an exploded diagram of a three-way line structure for a string light using a riveting process, with a wire protection box removed, according to an embodiment of the present disclosure.

With reference to FIG. 3-4, in an implementation, the first power wire 1 has a first connection position 16 where an insulation layer is removed, the second power wire 2 has a second connection position 17 where an insulation layer is removed, insulation layers are removed at both of an end portion 18 of the first conductor wire and an end portion 19 of the second conductor wire, the end portion 18 of the first conductor wire is electrically connected to the first connection position 16 and is riveted with the first copper strip 5, and the end portion 19 of the second conductor wire is electrically connected to the second connection position 17 and is riveted with the second copper strip 6. As such, it is more conducive to machine-aided operations in the process of manufacturing the three-way line structure for a string light using a riveting process, thus improving the manufacturing efficiency and yield rate.

In an implementation, the first connection position 16 and the second connection position 17 have the same length, and the end portion 18 of the first conductor wire with the insulation layer removed has the same as the length of the end portion 19 of the second conductor wire with the insulation layer removed. As such, it is more conducive to machine-aided operations in the process of manufacturing the three-way line structure for a string light using a riveting process, thus improving the manufacturing efficiency and yield rate. In other implementations, the first connection position 16 and the second connection position 17 may have different lengths. In other implementations, the end portion 18 of the first conductor wire with the insulation layer removed may have a different length than the end portion 19 of the second conductor wire with the insulation layer removed.

In an implementation, the end portion 18 of the first conductor wire with the insulation layer removed has a length less than the length of the first connection position 16, and the end portion 19 of the second conductor wire with the insulation layer removed has a length less than the length of the second connection position 17. As such, the electrical connection between the first conductor wire 3 and the first power wire 1 may be well riveted with the first copper strip 5, and the electrical connection between the second conductor wire 4 and the second power wire 2 may be well riveted with the second copper strip 6. In other implementations, the end portion 18 of the first conductor wire with the insulation layer removed may have a length greater than or equal to the length of the first connection position 16, and the end portion 19 of the second conductor wire with the insulation layer removed may have a length greater than or equal to the length of the second connection position 17.

In an implementation, the first copper strip 5 has a length less than the length of the first connection position 16, and the second copper strip 6 has a length less than the length of the second connection position 17. As such, the electrical connection between the first conductor wire 3 and the first power wire 1 is well riveted with the first copper strip 5, and the electrical connection between the second conductor wire 4 and the second power wire 2 is well riveted with the second copper strip 6. In other implementations, the length of the first copper strip 5 may be greater than or equal to the length of the first connection position 16, and the length of the second copper strip 6 may be greater than or equal the length of the second connection position 17.

Figure 5:
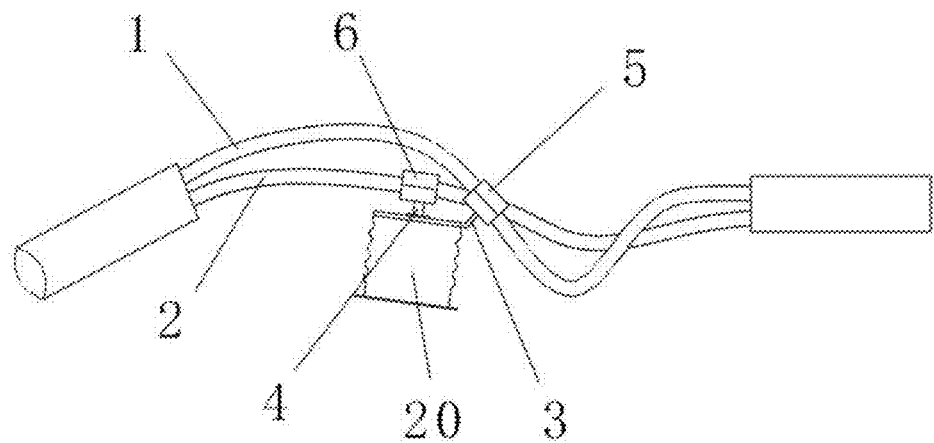
FIG. 5 is a schematic diagram of a three-way line structure for a string light using a riveting process, which is directly connected to the lamp head, according to an embodiment of the present disclosure.
Figure 6:
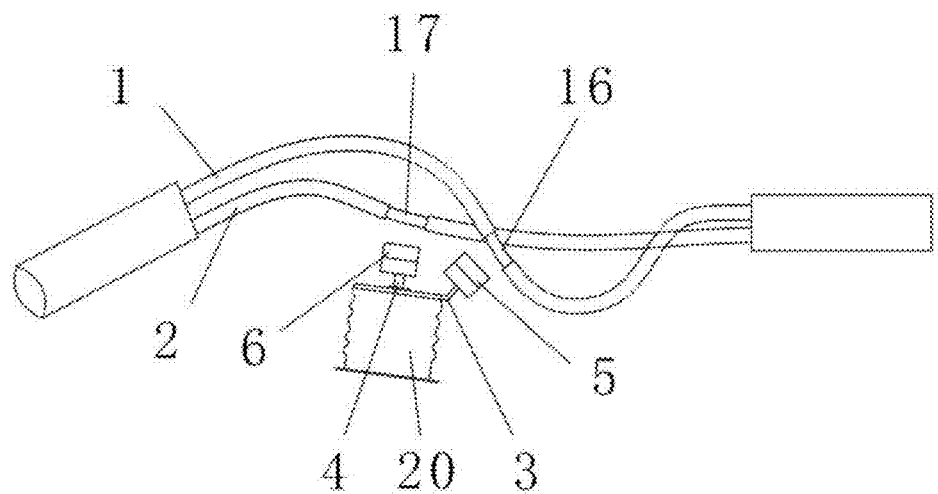
FIG. 6 is an exploded diagram of a three-way line structure for a string light using a riveting process, which is directly connected to the lamp head, according to an embodiment of the present disclosure.

In one embodiment, as shown in FIGS. 5-6, the first conductor wire 3 and the second conductor wire 4 may be pieces of metal that are directly connected to the positive and negative terminals of the lamp head 20 in order to facilitate the direct connection of the lamp head 20.

Those skilled in the art can freely combine and use the above additional technical features, provided that no conflict occurs.

The present disclosure further provides a string light including the three-way line structure for a string light using a riveting process as described above. The string light of the present disclosure is of the string light three-way line structure using a riveting process, and thus likewise has the advantages described above.

The foregoing implementations are only preferred implementations of the present disclosure and cannot be used to limit the scope of protection of the present disclosure. All non-essential modifications and substitutions made by those skilled in the art on the basis of the present disclosure shall fall within the scope of protection of the present disclosure.

The invention claimed is:

1. Three-way line structure for a string light using a riveting process, comprising:
    a first power wire for connection to a positive electrode of a power source;
    a second power wire for connection to a negative electrode of the power source;
    a first conductor wire electrically connected to the first power wire, an electrical connection between the first conductor wire and the first power wire being riveted with a first copper strip;
    a second conductor wire electrically connected to the second power wire, an electrical connection between the second conductor wire and the second power wire being riveted with a second copper strip; wherein the first conductor wire and the second conductor wire are connected to positive and negative electrodes of a light respectively so as to be able to supply power to the light; and
    a wire protection box, wherein an accommodating space is provided in the wire protection box, the wire protection box is provided with a first opening, a second opening, and a third opening, the first opening, the second opening and the third opening are each connected to the accommodating space, the first power wire and the second power wire run through the first opening and the second opening, the first conductor wire and second conductor wire run through the third opening, the electrical connection, riveted with the first copper strip, between the first conductor wire and the first power wire is within the accommodating space, and the electrical connection, riveted with the second copper strip, between the second conductor wire and the second power wire is within the accommodating space;
    wherein the first power wire has a first connection position where an insulation layer removed, the second power wire has a second connection position where an insulation layer removed, insulation layers are removed at an end of the first conductor wire and an end of the second conductor wire, the end portion of the first conductor wire is electrically connected to the first connection position and is riveted with the first copper strip, and the end portion of the second conductor wire is electrically connected to the second connection position and is riveted with the second copper strip, the first power wire and the second power wire are both continuous wires from the first opening to the second opening that are not cut off, the first connection position is located on the body of the first power wire, the second connection position is located on the body of the second power wire.

2. He three-way line structure for a string light using a riveting process of claim 1, wherein the wire protection box comprises a first housing and a second housing, the first housing being detachably connected to the second housing.

3. He three-way line structure for a string light using a riveting process of claim 1, wherein the wire protection box comprises a first pipe and a second pipe, an end portion of the second pipe is connected to the middle of the first pipe, the first pipe is connected and perpendicular to the second pipe, the first opening and the second opening are provided at two ends of the first pipe respectively, and the third opening is provided at an end of the second pipe away from the first pipe.

4. He three-way line structure for a string light using a riveting process of claim 3, wherein in the second pipe, a width of the second pipe is gradually reduced in a direction from an end of the second pipe close to the first pipe to the end of the second pipe away from the first pipe.

5. He three-way line structure for a string light using a riveting process of claim 1, wherein the first copper strip and the second copper strip have the same shape, and the first copper strip and the second copper strip have the same size.

6. He three-way line structure for a string light using a riveting process of claim 1, wherein the first connection position and the second connection position have the same length, and the end portion of the first conductor wire with the insulation layer removed has the same length as the end portion of the second conductor wire with the insulation layer removed.

7. He three-way line structure for a string light using a riveting process of claim 1, wherein the end portion of the first conductor wire with the insulation layer removed has a length less than the length of the first connection position, and the end portion of the second conductor wire with the insulation layer removed has a length less than the length of the second connection position.

8. He three-way line structure for a string light using a riveting process of claim 1, wherein the first copper strip has a length less than the length of the first connection position, and the second copper strip has a length less than the length of the second connection position.

9. String light, comprising:

a plurality of lights;

and a three-way line structure using a riveting process, which is connected to the plurality of lights, the three-way line structure comprising:

a first power wire for connection to a positive electrode of a power source;

a second power wire for connection to a negative electrode of the power source;

a first conductor wire electrically connected to the first power wire, an electrical connection between the first conductor wire and the first power wire being riveted with a first copper strip;

a second conductor wire electrically connected to the second power wire, an electrical connection between the second conductor wire and the second power wire being riveted with a second copper strip; wherein the first conductor wire and the second conductor wire are connected to positive and negative electrodes of a light respectively so as to be able to supply power to the light; and a wire protection box, wherein an accommodating space is provided in the wire protection box, the wire protection box is provided with a first opening, a second opening, and a third opening, the first opening, the second opening and the third opening are each connected to the accommodating space, the first power wire and the second power wire run through the first opening and the second opening, the first conductor wire and second conductor wire run through the third opening, the electrical connection, riveted with the first copper strip, between the first conductor wire and the first power wire is within the accommodating space, and the electrical connection, riveted with the second copper strip, between the second conductor wire and the second power wire is within the accommodating space; wherein the first power wire has a first connection position where an insulation layer removed, the second power wire has a second connection position where an insulation layer removed, insulation layers are removed at an end of the first conductor wire and an end of the second conductor wire, the end portion of the first conductor wire is electrically connected to the first connection position and is riveted with the first copper strip, and the end portion of the second conductor wire is electrically connected to the second connection position and is riveted with the second copper strip, the first power wire and the second power wire are both continuous wires from the first opening to the second opening that are not cut off, the first connection position is located on the body of the first power wire, the second connection position is located on the body of the second power wire.

* * * * *